US008737214B2

(12) United States Patent
Saavedra

(10) Patent No.: US 8,737,214 B2
(45) Date of Patent: May 27, 2014

(54) SYSTEM, METHOD AND COMPUTER PROGRAM FOR INTELLIGENT PACKET DISTRIBUTION

(75) Inventor: Patricio Humberto Saavedra, Toronto (CA)

(73) Assignee: Teloip Inc., Mississauga, Ontario (CA)

( * ) Notice: Subject to any disclaimer, the term of this patent is extended or adjusted under 35 U.S.C. 154(b) by 407 days.

(21) Appl. No.: 12/834,341

(22) Filed: Jul. 12, 2010

(65) Prior Publication Data

US 2012/0008496 A1    Jan. 12, 2012

(51) Int. Cl.
*G06F 11/00* (2006.01)
*H04L 12/26* (2006.01)
*H04L 12/56* (2006.01)
*H04Q 11/04* (2006.01)

(52) U.S. Cl.
CPC ............ *H04L 47/10* (2013.01); *H04Q 11/0478* (2013.01)
USPC .......................................... 370/231; 370/235

(58) Field of Classification Search
CPC ..... H04L 47/10; H04L 43/50; H04L 12/2697; H04L 12/5602; H04Q 11/0478
USPC .............. 370/229, 230, 230.1, 231, 232, 233, 370/234, 235, 235.1
See application file for complete search history.

(56) References Cited

U.S. PATENT DOCUMENTS

| | | | |
|---|---|---|---|
| 6,178,448 B1 * | 1/2001 | Gray et al. .................... | 709/224 |
| 6,438,135 B1 | 8/2002 | Tzeng | |
| 6,862,618 B1 * | 3/2005 | Gray et al. .................... | 709/224 |
| 7,376,097 B2 * | 5/2008 | Yegin ............................ | 370/328 |
| 7,580,355 B2 | 8/2009 | Zhao et al. | |
| 7,664,126 B2 * | 2/2010 | Funato .......................... | 370/412 |
| 7,898,959 B1 * | 3/2011 | Arad ............................. | 370/235 |
| 8,199,647 B2 * | 6/2012 | Schrodi ........................ | 370/231 |
| 2002/0120768 A1 * | 8/2002 | Kirby et al. .................. | 709/235 |
| 2003/0009585 A1 * | 1/2003 | Antoine et al. ............... | 709/238 |
| 2005/0286422 A1 * | 12/2005 | Funato .......................... | 370/235 |
| 2007/0177629 A1 * | 8/2007 | Yegin ............................ | 370/469 |
| 2007/0206565 A1 * | 9/2007 | Evans ........................... | 370/352 |
| 2011/0041002 A1 * | 2/2011 | Saavedra ......................... | 714/4 |
| 2011/0164503 A1 * | 7/2011 | Yong et al. ................... | 370/237 |

* cited by examiner

*Primary Examiner* — Chuong T Ho
(74) *Attorney, Agent, or Firm* — Norton Rose Fulbright Canada LLP

(57) ABSTRACT

The present invention provides a system, method and computer program for intelligent packet distribution over a plurality of potentially diverse links. The system includes an intelligent packet distribution engine ("IPDE") that incorporates or is linked to means for executing a decision tree. The IPDE, in real time, obtains data traffic parameters and, based on the data traffic parameters and performance criteria, selectively applies one or more techniques to alter the traffic over selected communication links to conform to the data traffic parameters.

25 Claims, 7 Drawing Sheets

Rate-Limit-Avoidance (RLA), w/ Bypass/Critical Reserve

(a)

Rate-Limit-Avoidance (RLA), w/ Bypass/Critical Reserve

(b)

ADSL

ADSL chart shows latency starting to peak at 63% usage

CABLE

CABLE chart shows latency starting to peak at 83% usage

SYSTEM, METHOD AND COMPUTER PROGRAM FOR INTELLIGENT PACKET DISTRIBUTION

FIELD OF THE INVENTION

The present invention relates to network traffic packet distribution. The present invention more specifically relates to an intelligent packet distribution system, method and computer program.

BACKGROUND OF THE INVENTION

Bonding and aggregation technologies enable two or more network devices to send and receive data packets across multiple communication links. Bonding or aggregation technologies typically use round-robin scheduling to send and receive data packets across all the lower links combined. In a round-robin algorithm, a load balancer assigns packet requests to a list of the links on a rotating basis. For the subsequent requests, the load balancer follows the circular order to redirect the request. Once a link is assigned a request, the link is moved to the end of the list. This keeps the links equally assigned.

Round-robin scheduling results in throughput degradation when the performance of the bonded or aggregated lines is substantially different. When these networks are combined the bonded lines inherit the latency of the worst case latency. Similarly, the transfer rate is governed by the slowest bonded line.

This interferes with the ability to provide a consistent, even, and optimum flow of bandwidth over multiple communication links, especially with real-time applications such as VoIP, which are highly sensitive to jitter and varying latency across the multiple lower links.

This less than optimal performance is explained by the fact that when relying on lower level communication links, each lower link may have dissimilar characteristics including asymmetrical speeds and latency variation. The speed of the aggregate throughput of a bonded or aggregated communication session is only as good as the least common speed multiplied by the number of lower links. This results in an inefficient aggregation or bonding that does not make optimal use of bandwidth that is available in combination.

Similar problems are experienced in fast failover techniques, where performance upon failing over to aggregated or bonded connections involving lower level links for example, is less than optimal.

The above issues are further aggravated by the fact that diverse carriers may have varying latency characteristics even when using similar access methods. Carrier diversity may entail the combining of legacy symmetrical circuits with newer asymmetrical type broadband circuits, creating a mix of faster and slower speeds in either direction, with varying latencies for all lower links combined.

For example, when two lower communication links are balanced (i.e. of the same speed), round-robin distribution typically results in full use of all the available bandwidth of the lower links combined. When one of the two lower links is unbalanced, however, round-robin distribution typically results in lower performance than the lower links combined. When using three lower links each with different speed and latency, round-robin distribution results in very poor performance and is practically unusable in many applications.

Distribution algorithms have been proposed for addressing these issues. For example, a weighted round-robin allocation has been proposed. Weighted round-robin is an advanced version of the round-robin that eliminates some of its deficiencies. In case of a weighted round-robin, one can assign a weight to each link in the group so that if one link is capable of handling twice as much load as the other, the larger link gets a weight of 2. In such cases, the load balancer will assign two requests to the larger link for each request assigned to the smaller one. U.S. Pat. Nos. 6,438,135 and 7,580,355, meanwhile, disclose dynamic approaches to the weighted round robin algorithm.

In addition to performance degradation, network congestion also presents a problem. Network congestion occurs when a network connection is overwhelmed by the data being transmitted over the connection. This results in quality of service (QoS) deterioration which is generally experienced as queuing delays, packet loss or the inability to process new connections.

Network congestion avoidance is the process used in networks to avoid congestion. Congestion in a network causes degradation of all services running across the network as all available capacity is consumed. This can occur due to a single network application consuming all available capacity. This affects latency and time sensitive applications such as voice, video streaming, etc.

To compensate and/or avoid the occurrence of congestion within a network link, queuing mechanisms are used to ensure that the available capacity is fairly distributed among all consumers of the link. There are a few commonly implemented queuing mechanisms, including: first in first out (FIFO), weighted fair queuing (WFQ), custom queuing (CQ), priority queuing (PQ). All these mechanisms manage traffic as it is received from the transmitter and before it is transmitted on through the interface.

Other queuing mechanisms include tail drop, random early drop (RED), weighted random early detection (WRED), and Blue. The most common form of protocol independent rate-limiting is performed by discarding excess packets using congestion management mechanisms such as tail drop. Other methods use packet queuing, adding delays to packets in transit or protocol specific built-in congestion control mechanisms that are typically not supported by most real time applications. The use of congestion management mechanisms such as tail drop to rate-limit bandwidth usage results in high jitter and packet loss, degrading the quality of real-time applications. This implementation cannot be used for real-time applications on low cost access solutions. The problem is further compounded when bandwidth usage approaches the upper threshold as the latency and loss rises exponentially compared to bandwidth usage. FIG. 5 illustrates latency relative to bandwidth in the prior art. It can be shown that latency starts to peak dramatically at a particular bandwidth usage.

Tail drop (also referred to as drop tail) is a simple queue management algorithm in which traffic is not differentiated. Tail drop allows a queue to fill to its maximum capacity and then drops new packets as they arrive until the queue has additional capacity. Tail drop differs from the previously mentioned mechanisms since it allows a queue to fill before taking any action while the others are more pro-active in queue management.

One disadvantage of tail drop is that on a network where a large volume of data is being transmitted, real time applications could suffer as the data may easily fill up the queue causing voice packets to be dropped.

Furthermore, in particular applications, such as VOIP (SIP), signaling traffic and RTP packets that contain the call audio could be dropped. Signaling traffic can be re-transmitted, however the timer for retransmits is about 500 ms for SIP and if critical packets within a SIP conversation are not acknowledged, the call will drop. RTP packets, meanwhile, are transmitted using UDP. This effectively causes dropped packets to be lost. Although the implementations of packet loss concealment (PLC) can mask some of the effects of packet loss in VOIP, large numbers of dropped calls affect call quality.

Active queue management mechanisms, meanwhile, implement mechanisms to alleviate some of the issues of tail drop by decreasing the number of dropped packets, increasing the utilization of links by decreasing the triggering of congestion control mechanisms within TCP conversations, lowering the queue size and decreasing the delays and jitter seen by flows and attempting to share the connection bandwidth equally among the various flows. Active queue management algorithms include RED, WRED and Blue.

Another disadvantage of tail drop is that can cause consumers of a particular network link to enter a slow-start state (which reduces data throughput) and even cause global synchronization often enough that the effect is deleterious to network throughput. While RED, WRED and Blue avoid the issue, RED and WRED are generally applicable to IP-only networks due to their dependence on the use of mechanisms built into TCP and the fact that packets are dropped rather than queued.

RED monitors the average queue size and drops packets based on statistical probabilities. It may also mark packets with explicit congestion notification (ECN). However, ECN is supported only by TCP/IP which makes it unfavorable as a mechanism for use with UDP based flows. Also, while ECN is present in most current TCP/IP protocol suites, they are generally shipped with it disabled.

WRED extends RED by providing several different queue thresholds based on the associated IP precedence or DSCP value. This allows lower priority packets to be dropped protecting higher priority packets in the same queue if a queue fills up. However, WRED also works only with TCP-based conversations. Other protocols such as IPX do not use the concept of a sliding window. When faced with a packet discard, these protocols simply retransmit at the same rate as before. RED and WRED are inefficient in a network utilizing non-TCP protocols.

A Blue queue maintains a drop/mark probability, and drops/marks packets with probability as they enter the queue. Whenever the queue overflows, drop/mark probability is increased by a small constant, and whenever the queue is empty, drop/mark probability is decreased by a constant which is less than the small constant used to increase probability. The main flaw of Blue, which it shares with most single-queue queuing disciplines, is that it doesn't distinguish between flows, and treats all flows as a single aggregate. Therefore, a single aggressive flow can push out of the queue packets belonging to other, better behaved flows.

Packet loss is a side effect of congestion which needs to be avoided when running a network that handles real-time traffic, such as VOIP or streaming video, as they are sensitive to packet loss. The main flaw of Blue, which it shares with most single-queue queuing disciplines, is that it does not distinguish between flows, and treats all flows as a single aggregate. Therefore, a single aggressive flow can push out of the queue packets belonging to other, better behaved flows.

Therefore, what is required is a queuing and distribution algorithm that uses bidirectional information to support asymmetrical environments and leverages the bandwidth of bonded or aggregated network connections, even where the links in the connection exhibit substantially different performance.

SUMMARY OF THE INVENTION

The present invention provides an intelligent packet distribution system for distributing one or more packets over a bonded or aggregated connection defined by a plurality of diverse links, the system comprising an intelligent packet distribution engine operable to determine, based on a decision tree, on which of the one or more links to distribute the one or more packets.

The present invention also provides a method for intelligent packet distribution of one or more packets over a bonded or aggregated connection defined by a plurality of diverse links, the method comprising: executing a decision tree for determining on which of the one or more links to distribute the one or more packets; and distributing, by means of an intelligent packet distribution engine, the one or more packets over the one or more links based on the determination.

The present invention further provides a method of managing traffic over one or more communication links in a bonded or aggregated connection, comprising the steps of: (a) detecting, by means of an intelligent packet distribution engine, one or more data traffic parameters affecting performance of the connection; and (b) based on the data traffic parameters applying rate limiting to one or more of such communication links by avoiding intermittently on a real time or near real time basis the communication of selected packets of over the one or more of such communication links thereby slowing down traffic over the one or more of such communication links so as to improve performance of the connection despite the data traffic parameters.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

The present invention provides a system, method and computer program for intelligent packet distribution. The system includes an intelligent packet distribution engine ("IPDE") for implementing an intelligent packet distribution workflow which may be implemented using an intelligent packet distribution algorithm ("IPDE distribution algorithm"). Intelligent packet distribution may be used in conjunction with techniques such as network connection aggregation for providing load balancing.

The present invention provides the ability to combine differing speed links with weighted packet distribution and with bidirectional real-time link intelligence. The IPDE is operable to collect, in real-time or near real-time (i.e. in substantially real-time), data regarding the performance of at least two network links enabling a network communication ("data traffic parameters"). The network links may be diverse bonded or aggregated network links and may exhibit substantially dissimilar performance characteristics including asymmetrical speeds (bandwidth), latency variation, or other varying characteristics. The IPDE may collect data traffic parameters for each of the links on a bidirectional basis.

The IPDE may also provide the ability to bypass/avoid link conditions on a per packet basis in near real-time to improve overall communications of the aggregated or bonded bundle of links. This can be accomplished by the IPDE, based on the data traffic parameters, applying rate limiting to one or more of the links by avoiding intermittently on a real time or near real time basis the communication of selected packets of over the one or more of such communication links thereby slowing down traffic over the one or more of such communication links so as to improve performance of the connection despite the data traffic parameters. This enables the IPDE to provide the ability to rate-limit on a per lower-link basis for all the links in an aggregated or bonded session in order to avoid non optimal bandwidth regions caused by carrier or network provider rate limiting with tail drop mechanisms.

Figure 1:
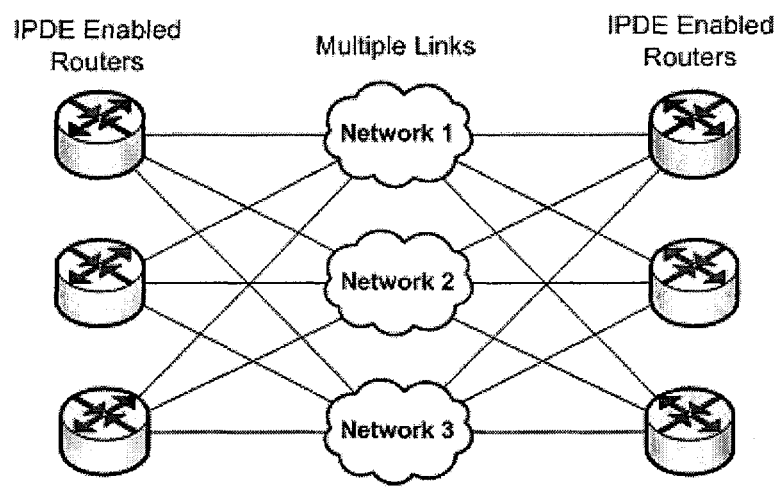
FIG. 1 is a system diagram illustrating an implementation of the intelligent packet distribution using a network utility.

The IPDE may be implemented as an IPDE network utility, as best shown in FIG. 1, that is operable to process or manage the distribution of packets of information for communication over a network. It may be implemented as hardware or as software; could be on a network connected server; could be implemented as an application linked to the transmitter and/or receiver network component. The invention may be implemented to a router in a network communication infrastructure. The functionality of the invention could be implemented as a chip and made part of a network device such as a router. The IPDE network utility may be implementable to any chip, server, router, transmitter, receiver or other network component/device that enables the collection, in real-time or near real-time (i.e. in substantially real-time), of data regarding the performance of at least two network links enabling a network communication ("data traffic parameters"). The nature and extent of the data traffic parameters that is required depends on the network provider.

In accordance with the invention, a plurality of network links (e.g. link A and link B, if just two links are used though there may be any number) is associated such that if for example one link (e.g. link A) is avoided, then the packets are sent to one or more of the other links (e.g. link B), so as to define a network connection. This association may consist of bonding or aggregation, but any association is sufficient, and bonding or aggregation is not required. The plurality of links may comprise one or more physical, logical and/or virtual links.

The IPDE network utility is operable to monitor network performance by measuring peaks in communication performance in relation to selected communication links, for example, by showing the speed of each communication link in and out. The IPDE network utility is also operable to include or obtain information regarding the data traffic parameters for a particular application that involves specific packets, for carriage over specific communication links. The IPDE network utility may incorporate or be linked to means for executing a decision tree and, in real time, obtaining the data traffic parameters and, based on the data traffic parameters and performance criteria (for example, preconfigured or configurable thresholds), selectively applying one or more techniques to alter the traffic over selected communication links to conform to the data traffic parameters.

For example, the decision tree may be implemented by the IPDE monitoring the performance of two or more network links via the data traffic parameters. If performance falls below the desired performance criteria that are defined in a manner that is relatively specific for specific network links, then the decision tree may initiate a process whereby the IPDE is operable to initiate one or more measures to manage packet distribution across the network links at issue. The IPDE may continue to monitor the data traffic parameters to manage traffic distribution so as to maintain and/or improve performance relative to the performance criteria, notwithstanding network conditions that may be having an adverse affect on performance relative to the performance criteria (e.g. degradation in communication of information packets over the network connection).

Packet distribution management may for example be based on a decision tree that considers any combination of one or more of the following: (1) bandwidth; (2) loss; (3) TOS (terms of services); (4) weighting; (5) rate limitation; (6) latency; (7) jitter; (8) application by-pass; (9) cost or financial considerations; (10) ToS (type of service) byte data; and/or (11) a custom filter. The application of these techniques, by operation of the IPDE network utility, results in temporary application of data traffic distributions across two or more links (whether physical or virtual) so as to optimize performance. These distributions may include: (a) weight based distribution, which involves adaptive configuration of weighting of traffic across two or more communication links; (b) rate-limit distribution which involves data traffic rate limitation over one or more of the communication links using link avoidance; (c) latency and jitter avoidance based distribution through control of latency and jitter across two or more communication links through avoidance and link selection in combination; and (d) application based distribution which bypasses specific applications affecting data traffic by selective application of avoidance on an application basis. Distribution may be by round robin, weighted round robin, or any other algorithm. The decision tree may render decisions for packet distribution between avoidance and transmit, for each of the links.

One advantage of IPDE is that it enables avoidance of one or more links in a connection. Avoidance of a link in a connection may become desirable, for example, because there may be a need to maintain the relationship with a particular link while temporarily or periodically avoiding the link due to bad performance, cost aspects or otherwise. Avoidance is implemented by the decision tree, as previously described.

Additionally, weighting of links may be provided by the IPDE network utility. Optionally, one or more of the links in a bonded or aggregated connection may be assigned a "zero weight", as further described below. The decision tree provided in accordance with the present invention enables, on a packet by packet basis avoiding the transmission of packets over one or more links (using rate limiting), based on the decision tree outcome. In this way, links with high cost, latency, jitter, or any other characteristic may be assigned a zero weight. Note that zero weighting of this type may be assigned on an intermittent basis, such as a real time basis, packet to packet basis or series of packets to series of packets (depending on the rate limit) basis. Packets may be analyzed closely to make the decision as to where they are going to be sent. The state of being zero weighted may be temporary on a per packet basis.

Intelligent packet distribution may for example be implemented to support voice, video, or any data communicated via network connection. The IPDE may be configurable based on the type of data carried on the connection so as to adjust parameters, such as avoidance parameters and desired performance criteria, accordingly. Intelligent packet distribution enables the management of performance two or more links having different data traffic parameters. For example, the IPDE could manage: (a) two or more links with different speeds (e.g. by providing a weighted packet distribution technique); (b) two or more links where one or more are symmetrical and one or more of the other links are asymmetrical; and/or (c) two or more links where there are differing latency conditions between respective links forming part of the two or more links. Other parameters are described above could also be used by the intelligent packet distribution Intelligent packet distribution is operable to determine packet distribution on a per-link basis while maintaining the association between the connection and other links for bandwidth purposes. The IPDE distribution algorithm may be operable to process bidirectional information to support asymmetrical environments. It may also be used for unidirectional network communications. It may provide a form of dynamic weighted round robin. It may be linked to means for executing a decision tree to determine packet distribution on per-link basis.

Figure 2:
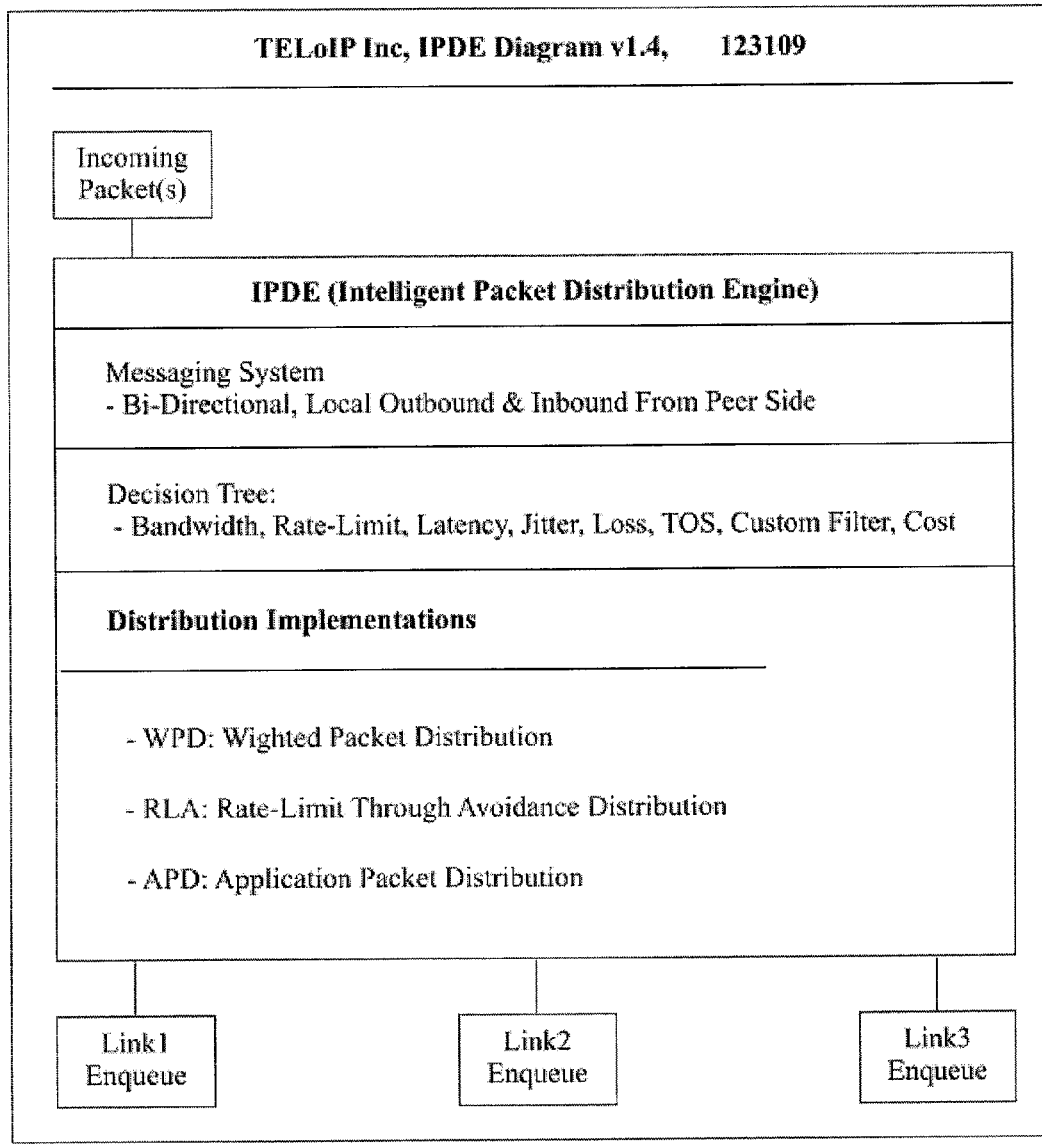
FIG. 2 illustrates an intelligent packet distribution engine in accordance with the present invention.

FIG. 2 illustrates an intelligent packet distribution engine in accordance with the present invention. The IPDE may be operable to provide for packet distribution for differing speed links (including but not limited to bonded or aggregated connections), asymmetrical distribution supporting dynamic weighted-round-robin techniques, load balancing, security, quality of service, and cost control if necessary. Asymmetrical distribution may, for example, address connections including a 6M connection and a 4M connection. Cost control may, for example, be a consideration where outbound network traffic has a higher cost (expressed, for example, in cost per Mbps) than that of inbound traffic. The packet distribution may be based on the data traffic parameters previously described.

Packet distribution may be managed by the IPDE in accordance with quality of service (QoS). For example, the IPDE may provide rate limiting through avoidance (RLA). IPDE may also provide weighted packet distribution or application packet distribution. IPDE, in accordance with QoS, may be implemented bidirectionally for at least two links or could be implemented unidirectionally including for local outbound and/or inbound configuration. A decision tree may be implemented based on a series of techniques to optimize performance in real time. The decision tree may enable the IPDE to queue packets on the links to provide QoS.

RLA may include priority queuing based on factors other than bandwidth, for example including based on time. The IPDE may include or be linked to a rate limiter that slows down a communication link to improve performance for selective types of data, including for example voice packets only or all packets other than voice.

FIG. 3 illustrates the operation of an intelligent packet distribution engine decision tree in accordance with the present invention. The decision tree, in particular examples, may consider weight based distribution, rate-limit based distribution, latency and jitter based distribution and application based distribution. Weight based distribution may be preconfigured (hard set) or automatically responsive to network conditions. For example, it may implement the weighted packet distribution or weight adaptive packet distribution techniques described more fully below. Rate-limit based distribution may control bandwidth through avoidance. For example, it may implement the rate limiting through avoidance technique described more fully below. Latency and jitter based distribution may control application latency and jitter through avoidance. For example, it may implement the rate limiting through avoidance technique described more fully below. Application based distribution may control applications via specific links through avoidance.

One of the possible measures of managing traffic distribution includes the reduction of speed of packet distribution over a network for the purpose of improving communication quality. This can be referred to as RLA. The reduction of speed may be achieved by means of avoidance (to provide communication rate limitation or traffic shaping). Another aspect of managing traffic distribution may include alteration, which may involve "shaping", slowing down, rerouting of data traffic etc., as further explained below. It should be understood that RLA can be implemented as a replacement for tail drop, or in conjunction with tail drop, to improve real-time application performance by preventing packet dropping particularly in real-time applications such as VoIP.

These techniques may consist of specific processes, algorithms or use of specific devices (such as rate limiting devices) to optimize performance across two or more links. The selective application is not just based on communication link performance but also parameters specific to the carrier operating the communication link which may require differences in the application of the one or more techniques.

The monitoring referred to above can be done in-band by or within a communication protocol.

Figure 3A:
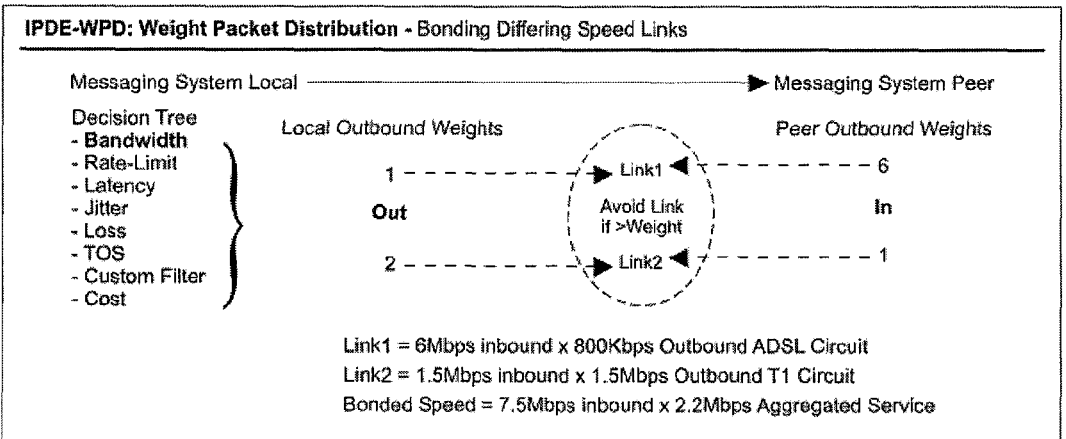
FIG. 3 illustrates a plurality of implementations of the intelligent packet distribution engine based on parameters and performance criteria considered in a decision tree.

The IPDE may embody a distribution algorithm that is operable to provided weighted packet distribution (WPD) as shown in FIG. 3A. WPD is advantageous to improve packet distribution for communications over multi-path networks. IPDE is operable to monitor speed and latency of associated connections and based on these parameters apply WPD automatically over different connections by link weight setting, thereby for example reducing late packet to destination effects. This provides better network performance despite packets passing over different connections, despite the possibility that in a multi-path network connection different connections may have different transfer capability. IPDE is operable to resolve such network conditions automatically.

It should be understood that the WPD technique may be adaptive. The WPD technique may be implemented to optimally enable the use of backup or redundant links in a bonded or aggregated connection. As shown in FIG. 3A, the parameter for IPDE associated with the communications in question is "bandwidth" such that Link1 is linked to Link2 so as to bond or aggregate different links associated with different speeds so as to provide WPD. WPD addresses problems of packet distribution for live data streams over multipath network connections. According to the speed and latency of different links, the IPDE can adjust the distribution of packets on the links based on a link weight to reduce late arrival of packets at their destination.

Figure 3B:
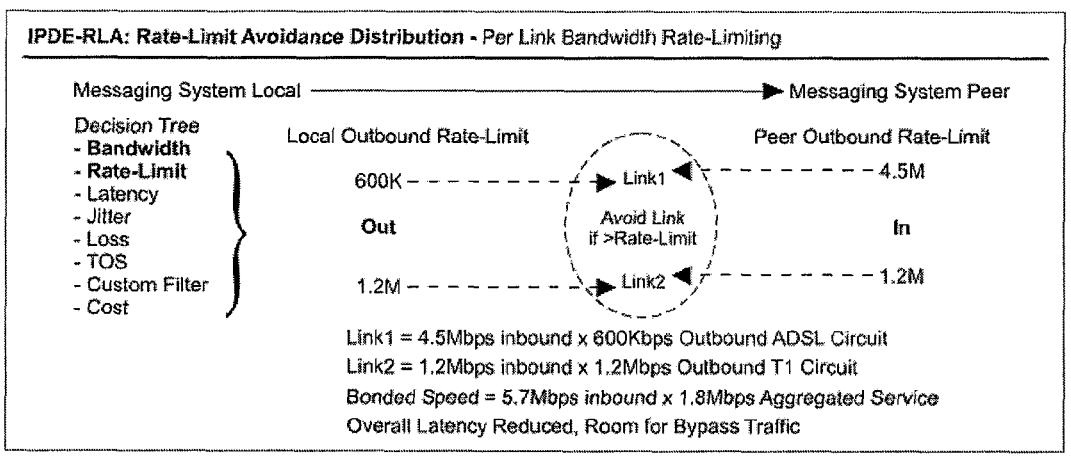

FIG. 3B illustrates that for other network communications, such as real-time applications where it is necessary to avoid packet latency, jitter, and packet loss, it may be advantageous to apply, in addition to WPD, rate limiting. In conventional applications of rate-limiting tail drop techniques are used for rate limiting, thereby creating high latency environments that may not be suitable for real-time applications in the upper echelon of the individual connections. As shown in FIG. 3B, the present invention includes rate limiting through avoidance, by setting rate-limits on use of specific connections in order to condition the real-time application traffic to avoid packet latency, jitter, or packet loss in a diverse carrier or multi-homed environment.

Figure 3C:
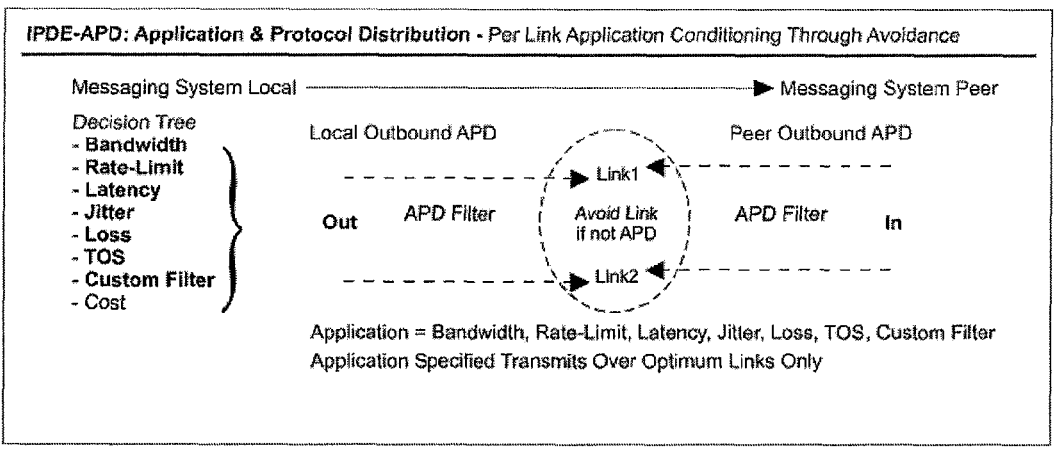

Similarly, FIG. 3C illustrates, for example for real-time applications how per link application conditioning through avoidance can be applied to comply with predetermined thresholds for bandwidth, rate limiting, latency, jitter, loss, TOS, and custom filters, all by operation of IPDE and across diverse carrier or multi-homed environments.

Figure 4:
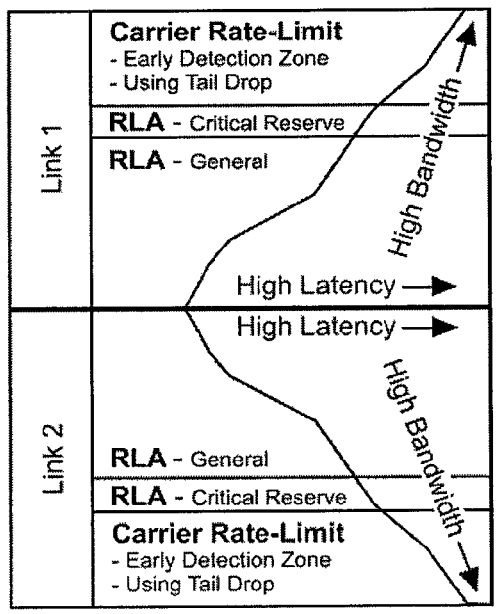
FIG. 4 illustrates rate limiting in accordance with the present invention using avoidance, providing thereby a bypass/critical reserve.
Figure 4:
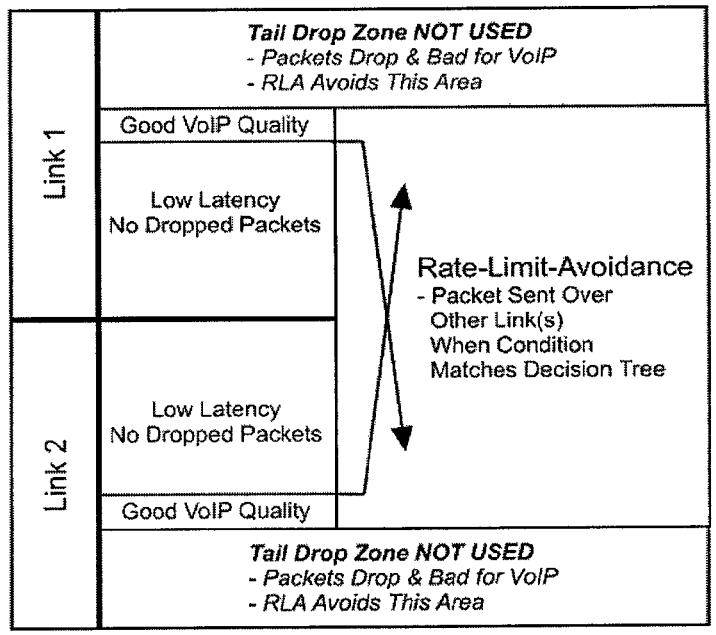

FIGS. 4A and 4B are helpful in understanding the present invention. FIG. 4A illustrates, based on prior art applications, how in traditional application of rate limiting, in high latency applications as required bandwidth increases, rate limits applied using conventional techniques can result in negative network conditions such as packet loss because, on a packet by packet basis, applied to link 1 or link 2, critical reserve and rate limit thresholds may be exceeded. In contrast, and by application of rate-limit-avoidance in accordance with the present invention, as illustrated in FIG. 4B, (a) the tail drop zone is NOT used for any application, using avoidance based on rate limiting (in accordance with the technique of the present invention), (b) optionally, by application of avoidance based on rate limiting a further threshold may be established so as to provide better performance on a packet by packet basis for real-time applications sensitive to jitter and varying latency across multiple lower links (such as VoIP), (c) link 1 and link 2 are associated (whether by bonding or aggregation) and on a packet by packet basis when there is a bandwidth requirement based on threshold (a) or optionally threshold (b), one or more affected packets, based on application of the IPDE decision tree, are automatically sent to the associated links.

It should be understood that this is different from bandwidth reservation, which does not operate on a packet by packet basis. It should be understood that by application of IPDE as illustrated in FIG. 4B, the links remain open to other packets provided that there is available bandwidth, however, once voice packets are received, for example, based on application of the decision tree, the rules defined by the decision tree for such packets are applied dynamically by IPDE, thereby providing bandwidth management that utilizes network resources more efficiently than bandwidth reservation. In other words IPDE is operable to react dynamically to changing network conditions, rather than attempt to set thresholds based on predicted network conditions, which tend to overestimate or underestimate network parameters that may affect network communications negatively, thus resulting either in less than optimal performance or less than optimal utilization of resources.

Conventional round robin scheduling results in throughput degradation when the performance of the bonded lines is substantially different, weights can be assigned to each of the network links. A higher weight may indicate a preferred link, which is typically of higher bandwidth and/or lower cost than other lower weighted links. Traffic is managed across the links by a typical weighted packet distribution algorithm. However, in the present invention, one or more of the links may be assigned a weight of zero.

A diverse carrier infrastructure may provide lower links having dissimilar characteristics including asymmetrical speeds (bandwidth) and latency variation. For example, carrier diversity may entail the combining of legacy symmetrical circuits with newer asymmetrical type broadband circuits, creating a mix of faster and slower speeds in either direction, with varying latencies for all lower links combined. Weighting of these links is a challenge since the use of these diverse carrier infrastructures creates an uncertainty for providing a consistent, even, and optimum flow of bandwidth in aggregated connections.

Real-time applications such as VoIP are highly sensitive to jitter and varying latency across the multiple lower links. These real-time applications, meanwhile, often include packets with heads having packet start/stop flags and sequence numbers. A receiver typically assembles packets according to sequence numbers for received packets across the lower links. When using unbalanced lower links, the sequence numbers may arrive out of order. The receiver may conclude that the packet is lost and request a retransmit of the packet at the missing sequence number. At this point, all received packets which are behind this missing sequence number will be dropped. The overall speed will begin to degrade as a result of retransmits.

One means by which to solve this problem includes implementing a packet distribution system based on weights, a "weighted packet distribution", for each lower link. The weight may be the number of packets to send at the round-robin interval for the corresponding link. Weight may have a direct relationship with speed and latency. WPD significantly improves the performance of a bonded session when using unbalanced and varying latency across the lower links combined.

In a particular implementation of WPD, links that are very slow or costly may be assigned a weight of zero. In a particular implementation of WPD, link weights may be automatically adjusted based on fluctuating broadband connections and saturated environments. This may be referred to as dynamic WPD.

Zero weighted links may be useful, for example, where an aggregated or bonded connection comprises both wired broadband links and a wireless link such as WiMAX or 3G cellular. In some cases these wireless links may have in excess of 1500% higher latency than the wired links. Including the wireless links in the WPD may typically cause significant degradation, however the wireless links may be desired or required as backup links.

In such cases, assigning a weight of zero to the slower or costlier links can enable them to be bypassed in regular packet distribution and only utilized when required.

If, based on the data traffic parameters, performance is determined to have fallen below desired performance criteria that are defined in a manner that is relatively specific for specific network links, then the decision tree may initiate a process whereby the IPDE is operable to initiate one or more measures to manage packet distribution across the network links at issue. The degraded network link may be avoided and the weighted packet distribution technique may check the weight of all remaining lower links. Non-zero weighted links may be used first and, if there are no non-zero weighted links, then the zero weighted links may be used to send packets out.

Determination of performance degradation may be made based on reassembly of received packets at a receiver. For example, if the data is sent with a sequence number, the IPDE may use the sequence number field to identify each packet. The sequence number may identify the order of the packets sent between network devices. When a packet is received out of sequence or not received at all, the decision tree may determine that a lower link is down. The IPDE may reference, for example, a lower link status table to obtain the minimum incoming sequence number from the buffer and use this value as the current sequence number in the packet reassemble code. If there are some unassembled packets in a downed link, these packets will be lost by the receiver. However, the transmitter may resend these packets and data transfers may recover. When a zero weighted link is added to the connection, the current minimum incoming sequence number may not be accurate on all links. Sequence numbers in a zero weighted link status table may be the sequence number of a previous incoming packet on this link. Typically, if the current minimum incoming sequence number is wrong, the reassemble code will fail and all application traffic will halt.

IPDE, however, may support zero weighted links by first modifying the reassemble code and the failover process. For example, it may calculate the minimum sequence number of the assemble code when a non-zero weight link is down; calculate the minimum sequence number of the assemble code when a zero weight link is down; calculate the minimum sequence number of the assemble code when a non-zero weight link is up; and calculate the minimum sequence number of the assemble code when a zero weight link is up.

Additionally, the weights may be assigned adaptively.

In a particular example, weights assigned to links may be chosen from the weight set {0, 1, 2, 3} with 0 reserved for undesirable links and 3 for the most preferred links. A maximum inbound speed may be detected among all links. For each link in the connection, it may be assigned a weight based on the link's inbound speed relative to the maximum inbound speed. For example, a link with at least 80% of the maximum speed may be assigned a weight of 3, while at least 40% is a weight of 2 and at least 20% is a weight of 1. Any other link may be assigned a weight of 0. A similar technique can be used for assigning an outbound weight for each link. If performance of the lines degrade such that no inbound and/or outbound links have a speed at least as much as a certain threshold, say 80% of the maximum, then the weights may be reduced and/or correspondingly later increased to compensate.

A weight adaptive packet distribution may dynamically adjust to changes when using dissimilar and or diverse carrier links. This may be beneficial, for example, where the maximum speed of dialup modem links degrade after initial connect and/or reconnections, which would diminish the speed of the aggregated connection. For example, when disconnects and reconnects occur, it is not guaranteed that the modem will reconnect at the same speed as it initially did when the session was first started.

As seen in FIG. 3B, the IPDE distribution algorithm may also be a rate limiting through avoidance (RLA) technique. Typically, all broadband and Metro Ethernet type connections use a tail drop technique for rate limiting services provided to customers. This causes a high latency environment when communicating in the upper echelon of the individual connections, a condition that must be avoided when transporting real-time applications due to packet latency, jitter and loss.

When mixing real-time applications such as voice and video with data, a congestion management algorithm is required for efficient delivery of one application versus another in a bandwidth saturated environment. Bandwidth reservation is an effective technique that can set aside bandwidth for specific applications. IPDE may implement RLA to overcome the disadvantages of the prior art, namely enabling rate limiting to be used on real-time applications such as VoIP. The IPDE can implement a decision tree that considers bandwidth and rate limit to provide RLA.

RLA uses two or more physical, logical and/or virtual connections to manage bandwidth usage. The concept is based on the principle of avoiding the condition of tail drop for rate-limiting to provide a more efficient and no packet loss mechanism to throttle bandwidth. By setting rate limits for links the IPDE can condition application traffic to avoid or reduce latency, jitter and loss. The IPDE may condition traffic on any links in a diverse carrier or multi-homed environment.

Figure 5:
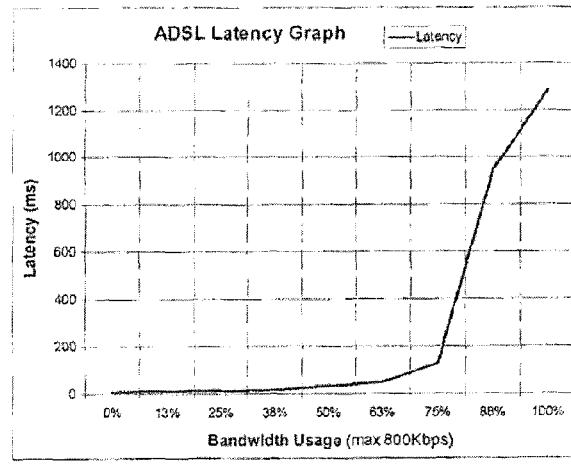
FIG. 5 illustrates latency relative to bandwidth in the prior art.
Figure 5:
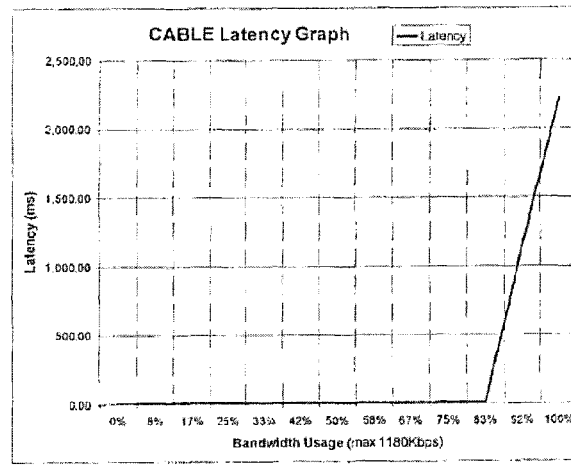

FIG. 5 illustrates latency relative to bandwidth in accordance with the prior art.

Figure 6:
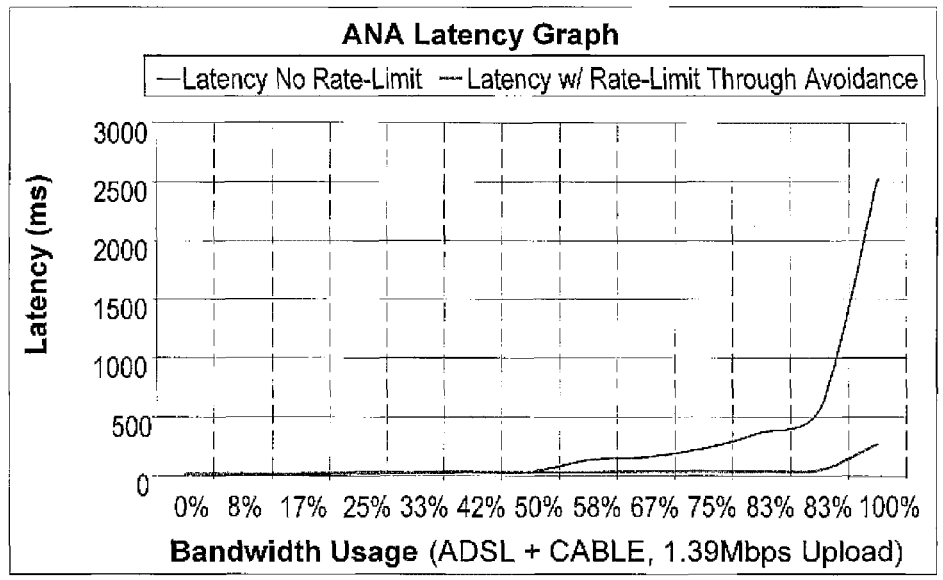
FIG. 6 illustrates latency relative to bandwidth in accordance with the present invention.

FIG. 6 illustrates latency relative to bandwidth in accordance with the present invention. As can be seen, latency begins to peak at 50% usage when no rate-limit through avoidance is applied, but there is no significant latency degradation using RLA.

RLA can be implemented as a protocol independent bandwidth management solution that does not provide congestion management for prioritization or bandwidth reservation of real-time applications. The avoidance of saturation for real-time applications using an RLA bypass technique is provided. This technique can be used to rate-limit all traffic excluding the real-time traffic.

The RLA-bypass technique may be used to override any RLA settings for specified traffic that can make use of non rate-limited bandwidth. The IPDE network utility may be configurable by a user to set RLA at a lower bandwidth rate and leave room for the priority traffic specified, in essence resulting in a bandwidth reservation technique.

As seen in FIG. 3C, the IPDE distribution algorithm may also be an application protocol distribution (APD) technique. Application delivery can vary based on a number of factors including corporate policy and real-time application requirements. The APD technique may include a decision tree that considers data traffic parameters including bandwidth, rate limit, latency, jitter, loss, TOS, byte data and custom filtering.

By adapting performance criteria based on application, the IPDE can achieve optimum quality for each application.

Figure 7:
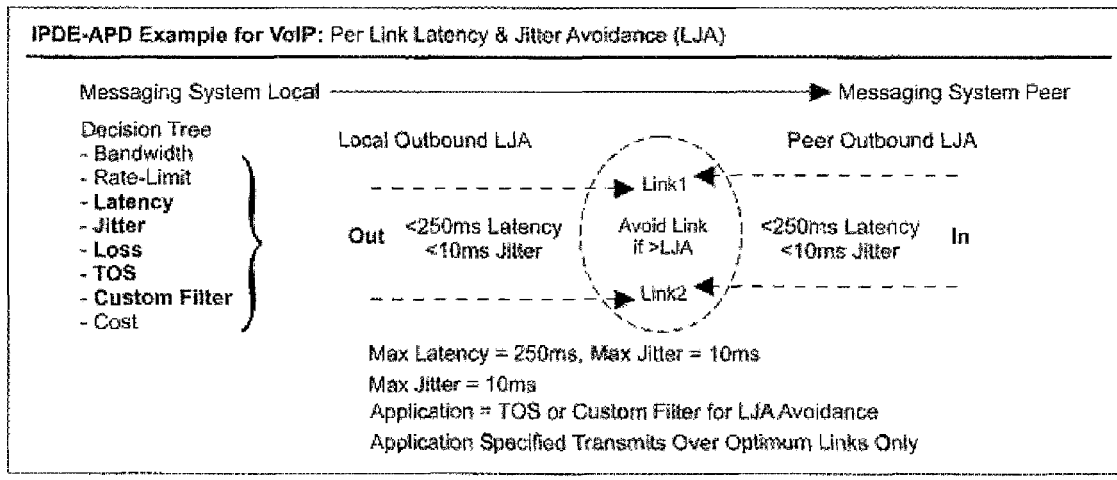
FIG. 7 illustrates an example of the intelligent packet distribution engine implementing application protocol distribution for a VoIP application.

FIG. 7 illustrates a particular example of the IPDE implementing an application protocol distribution technique for a VoIP application. A technique for a VoIP application preferably includes avoidance of latency and jitter to prevent poor quality voice conditions. The IPDE may implement APD so as to intelligently use latency and jitter information on a per link basis to avoid poor quality voice conditions for the transport of VoIP packets in a diverse carrier and/or multi-homed scenario.

The IPDE may implement a decision tree that considers data traffic parameters including latency, jitter, loss, TOS and a custom filter. For example, performance criteria may include a maximum allowable latency of 250 ms and a maximum jitter of 10 ms per link. By monitoring conditions on each link the decision tree can optimize latency and jitter by optimally distributing packets among the links. For example, a link may be avoided if the maximum latency or jitter is observed on the link. Packets can then be distributed to better performing links until the avoided link is ready to be brought back online.

The decision tree can be initialized and configured to include a consideration of one or more data traffic parameters including bandwidth, rate limit, latency, jitter, loss, TOS, byte data and customer filtering. Performance criteria including maximum and minimum thresholds may be set for one or more of the data traffic parameters. The decision tree can be configured to provide for two possible decisions: avoidance or transmit.

The decision tree can be configured for bidirectional or unidirectional configuration, including for local outbound and/or inbound configuration. Once configured, the IPDE may communicate with its peer at the other end of the connection to enable the configuration of the peer accordingly.

For each packet, the IPDE may determine the lower link bandwidth and latency, or other factors based on the data traffic parameters. Based on the calculation, the IPDE may adjust the lower link weight, as previously described.

For each of these packets, the IPDE checks the state of the current lower link based on the data traffic parameters and, based on whether the parameters are within the performance criteria or not, determines whether to send the packet on the current lower link. If not, the IPDE determines whether any other lower links in the connection are available for sending the packet. If so, that link's state is checked.

Once a link has been determined to be available for sending the packet based on having data traffic parameters within the performance criteria, the packet is enqueued on the link and a transmission protocol is used to send transmit the packet to the peer.

Figure 8:
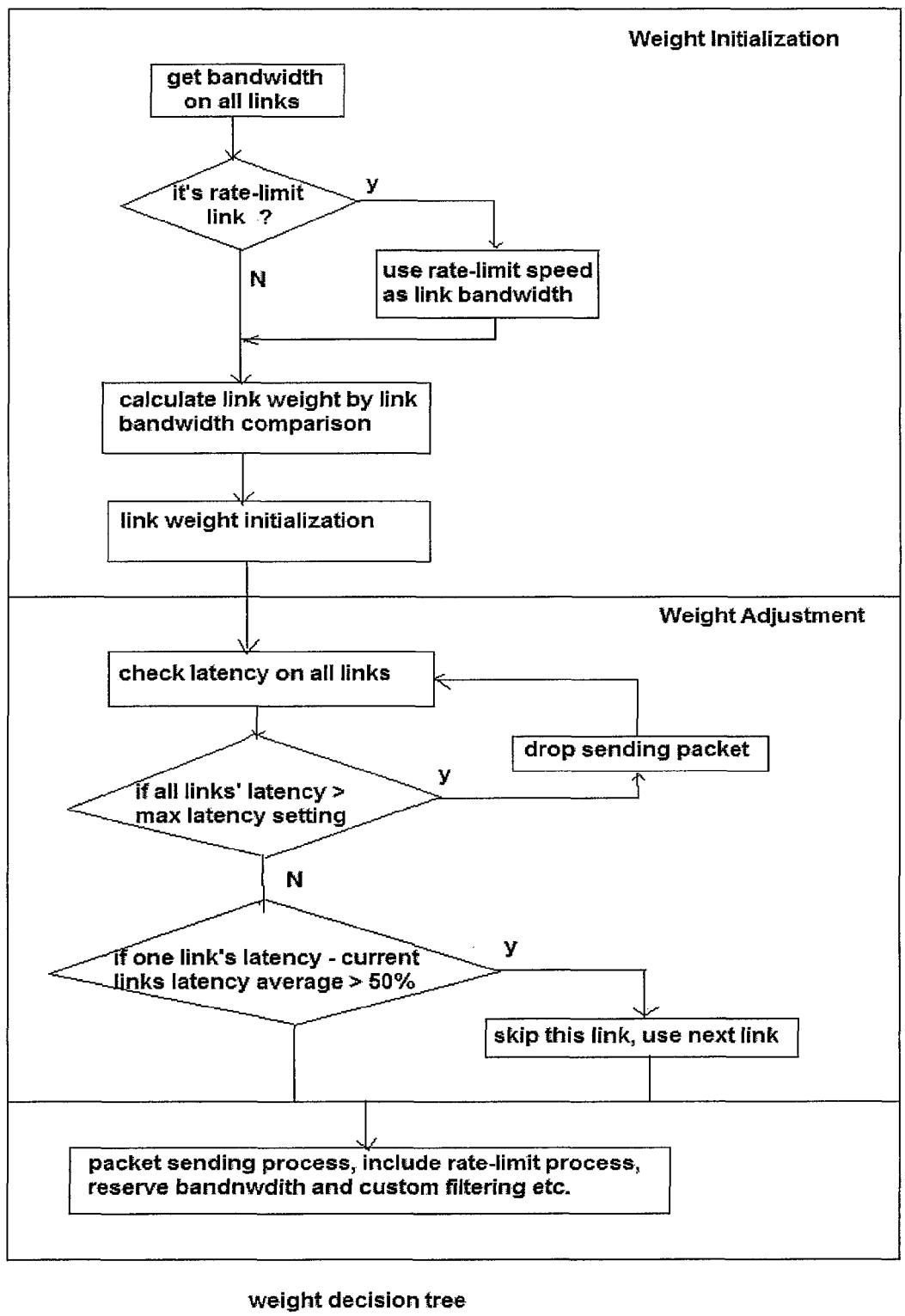
FIG. 8 illustrates a more detailed example of a decision tree in accordance with the present invention.

FIG. 8 illustrates another example of a decision tree. The decision tree can be initialized and configured to include a consideration of one or more data traffic parameters including bandwidth, rate limit, latency, jitter, loss, TOS, byte data and customer filtering. Performance criteria including maximum and minimum thresholds may be set for one or more of the data traffic parameters. The decision tree can be configured to provide for two possible decisions: avoidance or transmit.

The IPDE may initialize the weight of all links based on a link bandwidth comparison. The bandwidth of each link is first obtained and, based on a comparison of the bandwidths, weights are correspondingly assigned to each link.

The IPDE may then check the latency of each link. If all links have latency above the performance criteria, the packet to be sent may be dropped. Otherwise, a particular link may be chosen as the preferred link on which to send the packet. That link's latency is compared to the average link latency to determine whether it is poorly performing. For example, if the link latency is more than 50% higher than the average link latency, the link may be deemed poorly performing and the IPDE may select another link as the preferred link.

Once a link is chosen that exhibits acceptable latency, the IPDE may check the jitter of the link. The IPDE may then verify that the jitter of the link is below the performance criteria.

Thus, if a packet matches a particular configuration or threshold that is embodied in the decision tree, IPDE automatically applies the applicable decision process.

The invention claimed is:

1. A method of managing traffic over one or more communication links in a bonded or aggregated connection, comprising:
   detecting, by means of an intelligent packet distribution engine, one or more data traffic parameters affecting performance of the connection; and
   based on the data traffic parameters applying rate limiting to one or more of such communication links by avoiding intermittently on a real time or near real time basis the communication of selected packets over the one or more of such communication links thereby slowing down traffic over the one or more of such communication links so as to improve performance of the connection despite the data traffic parameters;
   wherein applying the rate limiting includes creating a reserve in the connection, and automatically adjusting one or more link rate-limits for using the reserve for reserved traffic.

2. The method of claim 1, wherein the one or more communication links have differing speeds and wherein the intelligent packet distribution engine detects the one or more data traffic parameters for each link bidirectionally.

3. The method of claim 1, wherein the avoiding of links is on a per packet basis in real time or near real time to improve overall communications of the aggregated or bonded connection.

4. The method of claim 1, wherein the communication links are associated with diverse carriers, or are diverging types of communication links.

5. The method of claim 1, comprising applying rate limiting by avoiding one or more of the communication links intermittently.

6. The method of claim 5 wherein rate limiting is applied on a packet by packet basis in order to improve performance of the connection, while maintaining available bandwidth.

7. The method of claim 1, comprising analyzing the connection to determine one or more lower performance regions, and avoiding the one or more lower performance regions by rate-limiting.

8. The method of claim 7, wherein the lower performance regions are poor quality bandwidth regions, and rate-limiting is used to avoid these poor quality bandwidth regions thereby improving performance of the connection overall.

9. The method of claim 8, wherein the connection carries data mixed with one or more of voice or video in order to improve quality of voice or video in real time applications.

10. The method of claim 7, wherein lower performance regions are associated with latency, jitter, loss, or poor bandwidth.

11. The method of claim 1, comprising selectively and intelligently applying rate limiting by accessing a decision tree executed by the intelligent packet distribution engine, the decision tree determining one or more particulars of applying rate limiting so as to improve performance or quality of the connection overall, based on the data traffic parameters.

12. The method of claim 1, comprising determining a rate limiting distribution across the multiple communication links that improves performance across the multiple links.

13. The method of claim 1, comprising creating a queue for applying the rate-limiting, and creating bypass of the queue for improved quality of real time or high priority data, wherein the remaining part of the connection is rate-limited.

14. The method of claim 1, wherein the rate limiting slows down, reroutes or shapes data traffic.

15. A system for bonding or aggregating one or more communication links comprising:
   (a) a bonding or aggregating network utility that when executed achieves bidirectional control of multiple communication links;
   (b) a network performance utility that includes an intelligent packet distributor that:
      (i) detects one or more data traffic parameters affecting performance of the connection; and
      (ii) based on the data traffic parameters applies rate limiting to one or more of such communication links by avoiding intermittently on a real time or near real time basis the communication of selected packets of over the one or more of such communication links, thereby slowing down traffic over the one or more of such communication links so as to improve performance of the connection despite the data traffic parameters;
   wherein the intelligent packet distributor creates a reserve in the connection, and automatically adjusts one or more link rate limits for using the reserve for reserved traffic.

16. The system of claim 15, wherein the one or more communication links have differing speeds and wherein the intelligent packet distributor detects the one or more data traffic parameters for each link bidirectionally.

17. The system of claim 15, wherein the intelligent packet distributor avoids communication links on a per packet basis in real time or near real time to improve overall communications of the aggregated or bonded connection.

18. The system of claim 15, wherein the communication links are associated with diverse carriers or are diverging types of communication links.

19. The system of claim 15, wherein the intelligent packet distributor applies rate limiting by avoiding one or more of the communication links intermittently.

20. The system of claim 15 wherein rate limiting is applied on a packet by packet basis in order to improve performance of the connection, while maintaining available bandwidth.

21. The system of claim 15, wherein the network performance utility analyzes the connection to determine one or more lower performance regions, and the intelligent packet distributor avoids the one or more lower performing regions by rate limiting.

22. The system of claim 15, wherein the intelligent packet distributor selectively and intelligently applies rate limiting by accessing a decision tree, the decision tree determining one or more particulars of applying rate limiting, based on the data traffic parameters.

23. The system of claim 15, wherein the intelligent packet distributor determines a rate limiting distribution across the multiple communication links that improves performance across the multiple communication links.

24. The system of claim 15, wherein the intelligent packet distributor creates a bypass, wherein the bypass is used for real time or high priority data, and the remaining part of the connection is rate-limited.

25. The system of claim 15, wherein the rate limiting slows down, reroutes or shapes data traffic.

* * * * *